United States Patent [19]
Cooper

[11] Patent Number: 4,888,101
[45] Date of Patent: Dec. 19, 1989

[54] SYSTEM FOR AND METHOD OF PHOTOCATALYTICALLY MODIFYING A CHEMICAL COMPOSITION AND METHOD OF CONSTRUCTING A PANEL UTILIZED IN THE SYSTEM AND THE METHOD

[76] Inventor: Gerald Cooper, 755 S. 42. St., Boulder, Colo. 80303

[21] Appl. No.: 888,872

[22] Filed: Jul. 24, 1986

[51] Int. Cl.[4] .................. B01J 19/08; B32B 3/00
[52] U.S. Cl. .................. 204/157.15; 204/157.4; 204/157.6; 204/193; 422/186; 422/186.3; 427/180
[58] Field of Search .............. 204/157.15, 157.41, 204/157.42, 157.43, 154.44, 157.61, 157.62, 157.63, 900, 901, 902, 903, 157.6, 193; 422/186, 186.01, 186.3; 427/180

[56] References Cited
U.S. PATENT DOCUMENTS
4,478,699 10/1984 Halmann et al. .............. 422/186
4,481,091 7/1984 Brus et al. .............. 204/157.15

FOREIGN PATENT DOCUMENTS
2535119 2/1976 Fed. Rep. of Germany .............. 204/157.15

Primary Examiner—John F. Niebling
Assistant Examiner—Ben C. Hsing

[57] ABSTRACT

A system for photocatalytically modifying a chemical composition comprising a semiconductor powder dispersed and entrapped within a layer of Pyrex glass wool interposed between two transparent plates. When a fluid containing the chemical composition flows through the glass wool and around the semiconductor powder, electromagnetic radiation impinging upon the semiconductor powder causes the chemical composition to be modified. A method for modifying the chemical composition and a method of manufacturing a panel for use in the system and method are also disclosed.

26 Claims, 2 Drawing Sheets

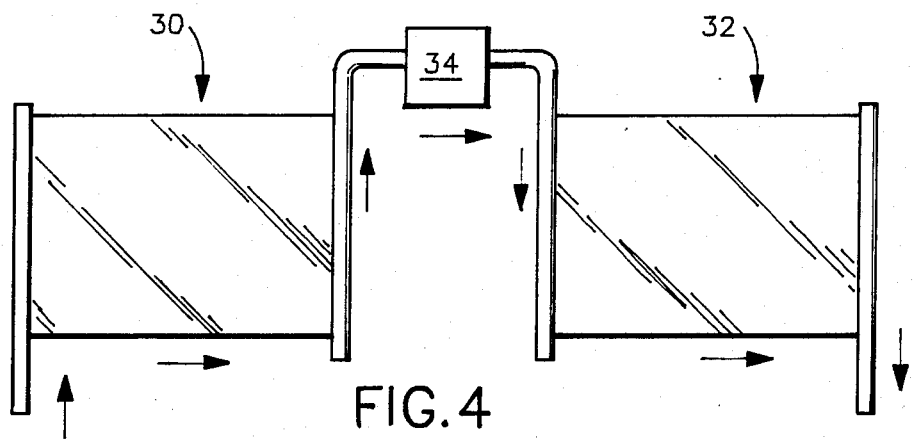
FIG. 4
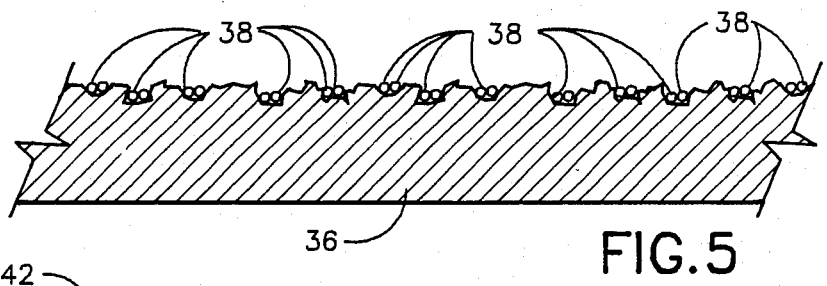
FIG. 5
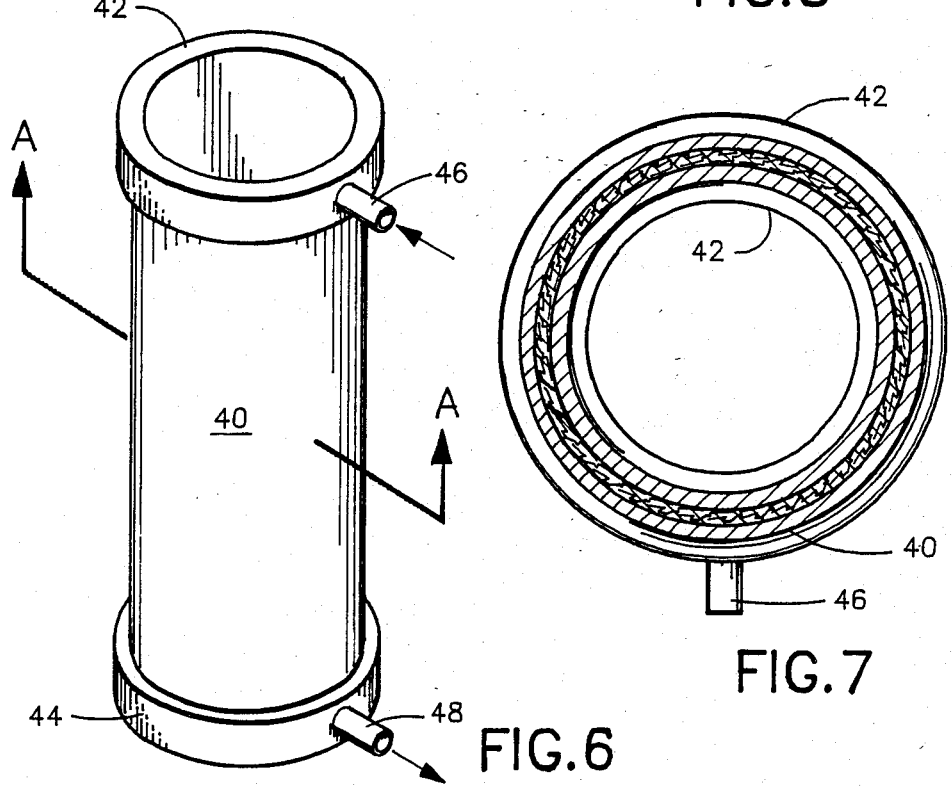
FIG. 6
FIG. 7

SYSTEM FOR AND METHOD OF PHOTOCATALYTICALLY MODIFYING A CHEMICAL COMPOSITION AND METHOD OF CONSTRUCTING A PANEL UTILIZED IN THE SYSTEM AND THE METHOD

BACKGROUND OF THE INVENTION

A relatively new technology uses semiconductor powders to carry out photocatalytic processes. Irradiation of the semiconductor with light of energy equal to or greater than the band gap results in the creation of holes in the semiconductor valence band and electrons in the semiconductor conduction band followed by trapping of the separated charges in shallow traps at the semiconductor particles surface. The injection of these electrons and holes into the region surrounding the semiconductor particles surface causes a chemical modification of substances within the region. Such technology has been used in at least the following photocatalytic processes: the photo-Kolbe reaction in which acetic acid is decomposed to methane and carbon dioxide; the photosynthesis of amino acids from methane-ammonia-water mixtures; the decomposition of adipic acid to carbon dioxide, butane, and valeric acid; the production of hydrogen from several aliphatic and aromatic compounds (including fossil fuels) with water; the degradation of chlorinated hydrocarbons to carbon dioxide and hydrochloric acid; the oxidation of cyanide; the sterilization against aqueous microbial cells; and the deposition of metals from their aqueous ions. Some of the exemplary literature describing experiments utilizing such technology are: "Photocatalytic Reactions of Hydrocarbons and Fossil Fuels with Water. Hydrogen Production and Oxidation", by K. Hashimoto, T. Kawai, and T. Sakata, *J. Phys. Chem.*, Vol. 88, No. 18, pp. 4083–4088, 1984; "Solar Photoassisted Catalytic Decomposition of the Chlorinated Hydrocarbons Trichloroethylene and Trichloromethane", by S. Ahmed and D. Ollis, *Solar Energy*, Vol. 32, No. 5, pp. 597–601, 1984; "Heterogeneous Photocatalytic Decomposition of Benzoic Acid and Adipic Acid on Platinized $TiO_2$ Powder. The Photo-Kolbe Decarboxylative Route to the Breakdown of the Benzene Ring and to the Production of Butane", by I. Izumi, F. F. Fan, and A. J. Bard, *J. Phys. Chem.*, Vol. 85, No. 3, pp. 218–223, 1981; "Heterogeneous Photocatalytic Oxidation of Aromatic Compounds on $TiO_2$", by M. Fujihira, Y. Satoh and T. Osa, *Nature*, Vol. 293, pp. 206–208, 1981; "Powder Layer Photoelectrochemical Structure", by R. E. Hetrick, *J. App. Phys.*, Vol. 58, No. 3, pp. 1397–1399, 1985; "Solar Assisted Oxidation of Toxic Cyanide", Langley Research Center, Hampton, Virginia, *NASA Tech Briefs*, p. 106, Spring 1985; "Photocatalytic Decomposition of Water and Acetic Acid Using a Powder-Layer Photoelectrochemical Structure", by R. E. Hetrick, *App. Phys. Comm.*, Vol. 5, No. 3, pp. 177–187, 1985; "Photoelectrochemical Sterilization of Microbial Cells By Semiconductor Powders", by T. Matsunaga. R. Tomoda. T. Nakajima, and H. Wake, *FEMS Microbiology Letters*, Vol. 29, pp. 211–214, 1985 "Photocatalytic Deposition of Metal Ions Onto $tiO_2$ Powder", by K. Tanaka, K. Harada, and S. Murata, *Solar energy*, Vol. 36, No. 2, pp. 159–161, 1986.

It is believed that all present systems utilizing the technology maintain the chemical compounds to be modified in a gas mixture, gas solution, a gas/liquid mixture, a liquid, or another fluid for the most effective contact between the chemical compound and the semiconductor powder. In most of the systems, the semiconductor powder itself is also suspended and mixed in the gas or liquid and is maintained in such suspended and mixed condition by bubbling a gas through a liquid, constantly stirring the fluid with a magnetic stirrer, for example, or continuously circulating the fluid with a pump. A problem with suspending and mixing the semiconductor powder in a gas or liquid is that some means must be utilized to maintain the semiconductor powder in a suspended and mixed condition and that the semiconductor powder must be segregated from the modified chemical compound, especially if the semiconductor powder is to be reused. In another system, a porous layer of semiconductor powder is placed on a metalized substrate by dispersing the powder in a polymeric binder dissolved in an organic solvent, spinning the mixture onto the metalized substrate, and burning off the binder. Two major drawbacks of placing the semiconductor powder on a metalized substrate are that the semiconductor powder is prone to becoming disengaged and displaced from the substrate because of the relatively very weak forces attracting the powder to the substrate and that only a thin sheet of gas or liquid can come into intimate contact with the semiconductor powder in order to modify the chemical compound. It also appears that the known systems carry out photocatalytic processes on a batch or intermittent basis for modifying relatively small amounts of chemical substances. Consequently, there is a need for a system which will maintain the semiconductor powder in a predetermined position while at the same time permitting relatively large volumes of the gas or liquid containing the chemical compound to be modified to pass through and come into intimate contact with the semiconductor powder in a continuous or plug flow.

SUMMARY OF THE INVENTION

The present invention relates to a photocatalytic system for modifying a chemical composition comprising a semiconductor powder dispersed and entrapped within a layer of vitreous or chemically inert fibers interposed between two transparent plates. When a fluid containing the chemical composition flows through the fibers and around the semiconductor powder, electromagnetic radiation impinging upon and absorbed by the semiconductor powder causes the generation of electron-hole pairs which in turn causes modification of the chemical composition. A method for photocatalytically modifying the chemical composition and a method of manufacturing a panel for use in the system and method are also disclosed. The chemical compositions to be modified include, but are not necessarily limited to, those chemical compositions photocatalytically modified as described in the above-referenced articles, including microbial cells.

BRIEF DESCRIPTION OF THE DRAWINGS

The invention will be described with reference to the accompanying drawings, wherein:

FIG. 4 is a system for photocatalytically modifying a chemical composition according to yet another embodiment of the present invention;

FIG. 5 is a cross-section of a material having a porous surface impregnated with semiconductor powder for use in a system for photocatalytically modifying a chemical composition according to still another embodiment of the present invention.

FIG. 6 is a system for photocatalytically modifying a chemical composition according to another embodiment of the present invention; and FIG. 7 is a cross-sectional view of the system shown in FIG. 6 taken along the line A—A.

DESCRIPTION OF A PREFERRED EMBODIMENT

Figure 1:
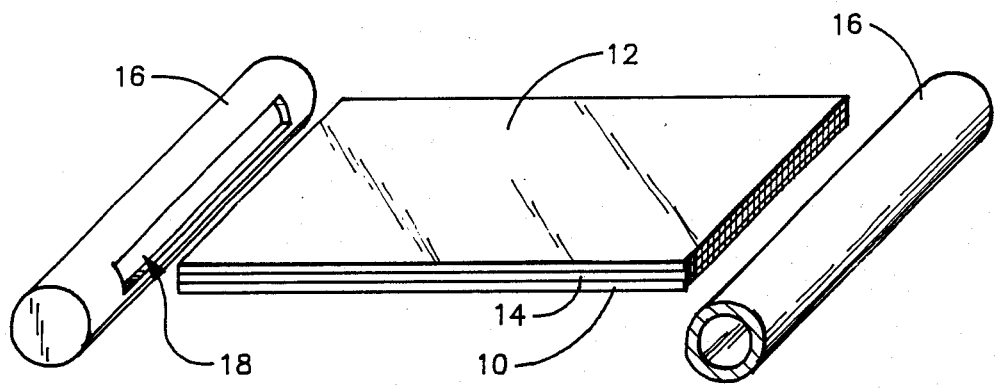
FIG. 1 is a perspective, partially exploded view of a system for photocatalytically modifying the chemical composition according to one embodiment of the present invention.
Figure 2:
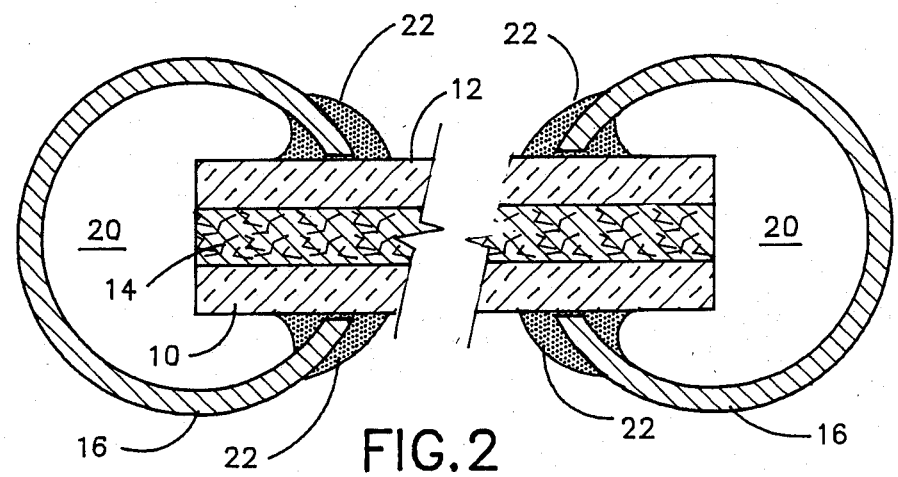
FIG. 2 is a longitudinal cross-section of the system shown in FIG. 1.

Referring now to the drawings wherein like reference numerals and symbols refer to the same item, there is shown in FIGS. 1 and 2 a system for photocatalytically modifying a chemical composition according to one embodiment of the present invention. The system includes a bottom plate 10, a top plate 12 and a uniform layer 14 of fiber mesh interposed between the two plates 10, 12. Initially the fiber mesh layer 14 is uniformly laid over the bottom plate 10 and then a semiconductor powder dispersed in water or the like is sprayed or otherwise deposited substantially uniformly over and intermixed throughout the fiber mesh layer 14. The water may be evaporated and then the top plate 12 is placed over the fiber mesh layer 14 whereby the fiber mesh layer 14 is sandwiched between the two plates 10, 12. The semiconductor powder thus is embedded in and entrapped by the fiber mesh. The plates 10, 12 and the fiber mesh layer 14 together form a panel.

The semiconductor powder can comprise any known semiconductor materials such as $TiO_2$, $ZnO$, $CdS$, $CdSe$, $SnO_2$, $SrTiO_3$, $WO_3$, $Fe_2O_3$, and $Ta_2O_5$, or metal or metal oxide loaded semiconductor materials such as $Pt/TiO_2$ or $RuO_2/TiO_2$. As stated previously herein, the semiconductor must be irradiated with a light of energy equal to or greater than the semiconductor's associated band gap. Consequently, at least one, and preferably both, of the plates 10, 12 are fashioned of a material which is preferably highly transparent to light of the required energy. Typically, the plates 10, 12 may be fashioned of quartz, Pyrex, glass, chemically stable plastic, or any other chemically stable, transparent, solid medium. The fiber mesh layer 14 preferably also is very highly transparent to light of the required energy. Although the fiber mesh layer 14 is preferably fashioned of Pyrex glass wool, it may also be fashioned of quartz, plastic or any other chemically stable, transparent, solid medium.

A gas or liquid containing the chemical composition to be modified is passed through the fiber mesh layer 14 and around the semiconductor powder intermixed, embedded and entrapped therein by means of two identical tubular headers 16 which may be in the same or opposite longitudinal orientation. Each header 16 is provided with a longitudinal slot 18 throughout a portion of its length, near an end thereof. The shape of the slot 18 substantially conforms to the shape of a corresponding longitudinal end of the panel formed by the two plates 10, 12 and the fiber mesh layer 14. Each of the tubular headers 16 also has a hollow interior passageway 20 extending throughout a portion of its length which is in communication with the slot 18. As best shown in FIG. 2, a longitudinal end of the panel is partially inserted into a corresponding slot 18 of a header 16 and is sealingly maintained in such relation by means of an epoxy 22 or the like. If the headers 16 are fashioned of the same material as the two plates 10, 12, then the headers 16 may be welded to the two plates 10, 12, or the headers 16 and the two plates 10, 12 may be integrally formed. Alternatively the headers 16 and the two plates 10, 12 may be sealed together with a gasket. The lateral edges of the panel are also sealed with an epoxy or the like, with a gasket or by welding (not shown). The headers 16 and the panel together form a module.

A gas or liquid containing the chemical composition to be modified passes through the axial passageway 20 of one of the headers 16 where it communicates with the leading edge of the fiber mesh layer 14. The gas or liquid then passes through the fiber mesh layer 14 and around the semiconductor powder embedded and entrapped therein. Light having the desired energy passes through at least one of the plates 10, 12 and impinges upon and is absorbed by the semiconductor powder whereby the chemical composition is photocatalytically modified. The gas or liquid containing the modified chemical compound exits from the fiber mesh layer 14 into the passageway 20 of the other header 16. It will be appreciated that the module permits relatively large amounts of gas or liquid to pass through the fiber mesh layer 14 in a continuous or plug flow process.

Figure 3:
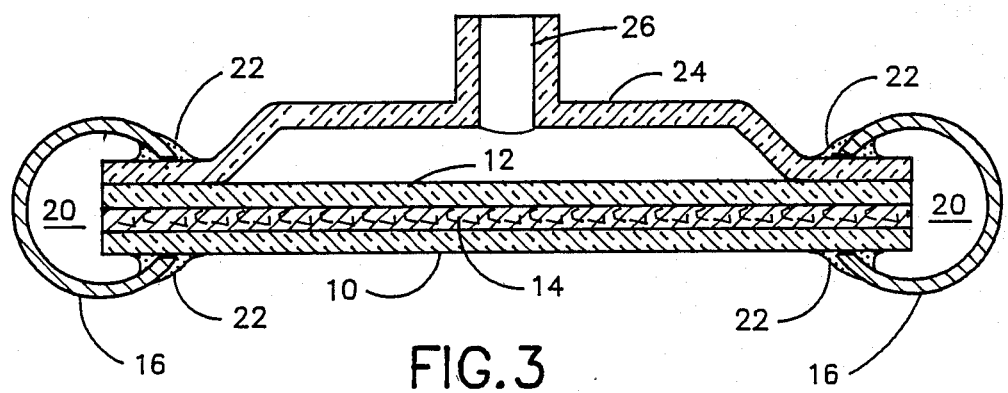
FIG. 3 is a longitudinal cross-section of a system for photocatalytically modifying a chemical composition according to another embodiment of the present invention.

FIG. 3 depicts a photocatalytic system according to another embodiment of the invention. The photocatalytic system shown in FIG. 3 is in all respects identical to the photocatalytic system shown in FIGS. 1 and 2 except that the top plate 12 is porous for permitting a gas to pass therethrough and except for the provision of a cover 24. The peripheral edges of the cover 24 are adapted for sealing engagement with the top plate 12, and the longitudinal, peripheral ends thereof are partially inserted into a corresponding slot 18 of a header 16 and sealed with an epoxy 22 or the like. The interior of the cover 24 is spaced from the top plate 12 and is provided with a port 26 through which a gas, such as oxygen, may be injected into the region between the cover 24 and the top plate 12, through the top plate 12, and into the gas or liquid containing the chemical composition to be modified. Preferably the gas is pressurized so as to prevent the gas or liquid in the fiber mesh layer 14 from passing through the plate 12 and into the region between the top plate 12 and the cover 24. The cover 24 also preferably is highly transparent to light of the required energy and may be fashioned of quartz, Pyrex, glass, chemically stable plastic or any other chemically stable, transparent, solid medium. The embodiment of the photocatalytic system shown in FIG. 3 is especially useful when a particular gas, in a quantity larger than can be achieved by dissolution in a liquid, is needed to effectuate the modification of the chemical compound.

The photocatalytic system shown in FIG. 4 is especially suited for relatively complicated or difficult modification of chemical compounds where a gas such as oxygen is needed to effectuate the modification. The system includes two modules 30, 32 identical in all respects to the module shown in FIGS. 1 and 2 which are in fluid communication with each other. In operation, a gas or liquid containing the chemical composition to be modified flows through the module 30, passes a pump 34, where oxygen or other gas is injected into the gas or liquid, and then flows through the module 32, as shown by the arrows in FIG. 4. Additional modules and pumps may be further interconnected in series.

FIG. 5 depicts a block 36 having a porous surface. The block 36 may be fashioned of ceramic, pumice or the like. Several grains 38 of a semiconductor powder are forcefully impregnated into the pores and crevices of the porous surface where they become embedded and entrapped. A gas or liquid containing the chemical composition to be modified flows over the porous surface and around the semiconductor powder. Alternatively a transparent plate (not shown) may be placed over the porous surface of the block 36 containing the impregnated semiconductor powder grains 38 to help regulate the thickness of the gas or liquid flowing over the block surface. Also a relatively thin slab of the block 36 may be thoroughly impregnated with semiconductor powder grains 38 and may be substituted for the fiber mesh layer 14 in any of the other embodiments described herein.

FIGS. 6 and 7 depict a photocatalytic system according to still another embodiment of the present invention. A panel 40 is constructed similarly in all respects to the panel shown in FIGS. 1 and 2 except that the panel 40 is shaped in a cylindrical tube instead of being planar. Alternatively the panel 40 may be shaped in a frusto-conical tube. An upper header 42 and a lower header 44 are disposed over a corresponding longitudinal end of the panel 40. Each header 42, 44 is constructed similarly to the headers 16 except that the headers 42, 44 are shaped in a circular ring and have a rectangular cross section and the headers 42, 44 are provided with corresponding ports 46, 48 for the entrance and exit of fluid as shown by the arrows in FIG. 6. The headers 42, 44 are sealingly attached to the panel 40 in the same manner as the headers 16 are sealingly attached to the panel shown in FIGS. 1 and 2.

The system according to the present invention may be used for a wide variety of chemical reactions such as those described in the above-listed articles. Moreover, it is believed that the present system can be used to photocatalytically decompose toxicants such as solvents and pesticides into harmless chemical compounds. A special use of the present system is in connection with space travel where recycling water is of critical importance. Water used in experiments as well as water such as urine, shower water, and condensate are presently decontaminated on space vessels by distilling the water and then passing the water through activated charcoal. The degree of purification resulting from this process is still unsatisfactory, and the system of the present invention could be used subsequent to passing the water through activated charcoal.

A solar irradiated module shown in FIGS. 1 and 2 has been used by the inventor in connection with several experiments to determine its effectiveness in decomposing contaminates in water. Colored dyes have been mixed in the ratio of two parts per million (ppm) with water, aerated and then passed through the module. The liquid passing through the fiber mesh of the module gradually turns colorless. Some of the colored dyes used in these experiments include methylene green, Jane's green B (diazin green), congo red, and 5, 5', 7, 7' indigo-tetrasulphonic acid, tetrapotasium. Also, rotenone, a fish poison, was mixed in the ratio of two-five ppm with water. Fish placed within such liquid expired within a few minutes. The liquid was passed through the solar irradiated module shown in FIGS. 1 and 2, and fish were placed in the resultant liquid without any observable, harmful effects to the fish. In yet another experiment, urine was decolorized and deorderized by the solar irradiated module.

Chemical analysis of the solutions that contained the organics and were passed through the solar irradiated module showed that the total organic carbon (TOC) had been reduced by almost eighty percent (80%).

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than is specifically described above.

I claim:

1. A system for photocatalytically modifying a chemical composition comprising:
   means for maintaining the chemical composition in a fluidized condition;
   a semiconductor material in powder form;
   a fiber mesh for entrapping said semiconductor powder such that the fluidized chemical composition passes around said semiconductor powder substantially without displacing said semiconductor powder;
   means for passing the fluidized chemical composition around said semiconductor powder; and
   means for permitting said semiconductor powder to be exposed to electromagnetic radiation such that the electromagnetic radiation impinges upon said semiconductor powder when the fluidized chemical composition passes around said semiconductor powder, whereby the chemical composition is modified.

2. A system for photocatalytically modifying a chemical composition according to claim 1 wherein said fiber mesh is substantially transparent to the electromagnetic radiation.

3. A system for photocatalytically modifying a chemical composition according to claim 2 wherein the composition of the fiber mesh is selected from the group of materials consisting of quartz, glass, and plastic.

4. A system for photocatalytically modifying a chemical composition according to claim 1 further comprising a first plate, and wherein said permitting means includes a second plate fashioned of a material substantially transparent to the electromagnetic radiation, and wherein said fiber mesh is interposed in a layer between said first plate and said second plate.

5. A system for photocatalytically modifying a chemical composition according to claim 4 wherein said first plate, said fiber mesh, and said second plate form a panel having a first longitudinal edge and a second longitudinal edge and wherein said passing means introduces the fluidized chemical composition into the fiber mesh at the first longitudinal panel edge and removes the fluidized, modified chemical composition at the second longitudinal panel edge.

6. A system for photocatalytically modifying a chemical composition comprising:
   means for maintaining the chemical composition in a fluidized condition;
   a semiconductor material in powder form;

means for entrapping said semiconductor powder such that the fluidized chemical composition passes around said semiconductor powder substantially without displacing said semiconductor powder;

means for passing the fluidized chemical composition around said semiconductor powder;

means for permitting said semiconductor powder to be exposed to electromagnetic radiation such that the electromagnetic radiation impinges upon said semiconductor powder when the fluidized chemical composition passes around said semiconductor powder, whereby the chemical composition is modified; and means for injecting a gas into the fluidized chemical composition substantially when the fluidized chemical composition passes around said semiconductor powder.

7. A system for photocatalytically modifying a chemical composition according to claim 6 wherein said entrapping means includes a fiber mesh.

8. A system for photocatalytically modifying a chemical composition according to claim 7 wherein said fiber mesh is substantially transparent to the electromagnetic radiation.

9. A system for photocatalytically modifying a chemical composition according to claim 8 wherein the composition of the fiber mesh is selected from the group of materials consisting of quartz, glass, and plastic.

10. A system for photocatalytically modifying a chemical composition according to claim 6 wherein said entrapping means includes a porous material and wherein said semiconductor powder is disposed within the pores of said porous material.

11. A system for photocatalytically modifying a chemical composition according to claim 6 further comprising a first plate and wherein said permitting means includes a second plate fashioned of a material substantially transparent to the electromagnetic radiation, and said entrapping means includes a fiber mesh, said fiber mesh interposed in a layer between said first plate and said second plate.

12. A system for photocatalytically modifying a chemical composition according to claim 11 wherein said first plate, said fiber mesh, and said second plate form a panel having a first longitudinal edge and a second longitudinal edge and wherein said passing means introduces the fluidized chemical composition into the fiber mesh at the first longitudinal panel edge and removes the fluidized, modified chemical composition at the second longitudinal panel edge.

13. A system for photocatalytically modifying a chemical composition according to claim 6 further comprising a first plate capable of permitting a gas to pass therethrough, wherein said permitting means comprises a second plate fashioned of a material substantially transparent to the electromagnetic radiation, wherein said entrapping means includes a fiber mesh, said fiber mesh interposed in a layer between said first plate and said second plate, and wherein said injecting means includes a cover spaced from and sealingly engaging said second plate, and wherein said injecting means further includes means for introducing the gas in the space region between said cover and said second plate.

14. A system for photocatalytically modifying a chemical composition according to claim 13 wherein the gas is injected in the space region between said cover and said second plate at a pressure sufficient to prevent substantially the fluidized chemical composition from passing through said second plate into the space region between said cover and said second plate.

15. A system for photocatalytically modifying a chemical composition comprising:

means for maintaining the chemical composition in a fluidized condition;

at least two panels, each panel comprising:
(a) a semiconductor material in powder form;
(b) means for entrapping said semiconductor powder such that the fluidized chemical composition passes around said semiconductor powder substantially without displacing said semiconductor powder;
(c) means for permitting said semiconductor powder to be exposed to electromagnetic radiation such that the electromagnetic radiation impinges upon said semiconductor powder when the fluidized chemical composition passes around said semiconductor powder, whereby the chemical composition is modified;

means for passing the fluidized chemical composition around the semiconductor powder in one of said panels, whereby the chemical composition is partially modified;

means for passing the fluidized, partially modified chemical composition around the semiconductor powder in another of said panels whereby the fluidized, partially modified chemical composition is further modified; and means for injecting a gas into the fluidized, partially modified chemical composition after passing around the semiconductor powder in said one panel and before passing around the semiconductor panel in said other panel.

16. A system for photocatalytically modifying a chemical composition according to claim 15 wherein said entrapping means includes a fiber mesh.

17. A system for photocatalytically modifying a chemical composition according to claim 16 wherein said fiber mesh is substantially transparent to the electromagnetic radiation.

18. A system for photocatalytically modifying a chemical composition according to claim 17 wherein the composition of the fiber mesh is selected from the group of materials consisting of quartz, glass, and plastic.

19. A system for photocatalytically modifying a chemical composition according to claim 15 wherein said entrapping means includes a porous material and wherein said semiconductor powder is disposed within the pores of said porous material.

20. A system for photocatalytically modifying a chemical composition comprising:

means for maintaining the chemical composition in a fluidized condition;

a semiconductor material in powder form;

a porous material for entrapping said semiconductor powder, said semiconductor material disposed within the pores of said porous material, such that the fluidized chemical composition passes around said semiconductor powder substantially without displacing said semiconductor powder;

means for passing the fluidized chemical composition around said semiconductor powder; and means for permitting said semiconductor powder to be exposed to electromagnetic radiation such that the electromagnetic radiation impinges upon said semiconductor powder when the fluidized chemical composition passes around said semiconductor powder, whereby the chemical composition is modified.

21. A method of photocatalytically modifying a chemical composition comprising the steps of:
   maintaining the chemical composition in a fluidized condition;
   providing a semiconductor material in powdered form and entrapping said semiconductor powder in a fiber mesh such that the fluidized chemical composition passes around said semiconductor powder substantially without displacing said semiconductor powder;
   passing the fluidized chemical composition around said semiconductor powder; and
   impinging electromagnetic radiation upon said semiconductor powder when the fluidized chemical composition passes around said semiconductor powder, whereby the chemical composition is modified.

22. A method of photocatalytically modifying a chemical composition comprising the steps of:
   maintaining the chemical composition in a fluidized condition;
   providing a semiconductor material in powdered form and entrapping said semiconductor powder by dispersing said semiconductor powder within the pores of a porous material such that the fluidized chemical composition passes around said semiconductor powder substantially without displacing said semiconductor powder;
   passing the fluidized chemical composition around said semiconductor powder; and
   impinging electromagnetic radiation upon said semiconductor powder when the fluidized chemical composition passes around said semiconductor powder, whereby the chemical composition is modified.

23. A method of photocatalytically modifying a chemical composition comprising the steps of:
   maintaining the chemical composition in a fluidized condition;
   providing a semiconductor material in powdered from and entrapping said semiconductor powder such that the fluidized chemical composition passes around said semiconductor powder substantially without displacing said semiconductor powder;
   passing the fluidized chemical composition around said semiconductor powder;
   impinging electromagnetic radiation upon said semiconductor powder when the fluidized chemical composition passes around said semiconductor powder, whereby the chemical composition is modified; and
   injecting a gas into the fluidized chemical composition substantially when the fluidized chemical composition passes around said semiconductor powder.

24. A method of photocatalytically modifying a chemical composition according to claim 23 wherein said semiconductor powder is entrapped in a fiber mesh.

25. A method of photocatalytically modifying a chemical composition according to claim 23 wherein said semiconductor powder is entrapped in a porous material and wherein said semiconductor powder is disposed within the pores of said porous material.

26. A method of making a panel utilized in photocatalytically modifying a chemical composition maintained in a fluidized condition comprising the steps of:
   providing a first plate substantially transparent to electromagnetic radiation;
   providing a second plate;
   providing a fiber mesh;
   spreading the fiber mesh in a substantially uniform layer over one of said plates;
   dispersing a semiconductor material in powder form substantially uniformly about the fiber mesh; and
   placing the other plate over the fiber mesh layer such that the fiber mesh layer is interposed between said two plates and such that the semiconductor powder is substantially entrapped by the fiber mesh and such that the fluidized chemical composition passes between said two plates and around said semiconductor powder.

* * * * *